UNITED STATES PATENT OFFICE 2,568,859

MAKING TRICHLOROMETHYL COMPOUNDS

Elbert C. Ladd, Passaic, and Lewis Y. Kiley, Hasbrouck Heights, N. J., assignors to United States Rubber Company, New York, N. Y., a corporation of New Jersey No Drawing. Application January 2, 1948,
Serial No. 348

4 Claims. (Cl. 260—491)

The present invention relates to a novel reaction of trichloromethane sulfonyl chloride with added functionally aliphatic olefinic compounds, i. e., olefinic compounds devoid of aromatic substituents on the ethylenically-bonded carbon atoms. We have now found that whereas many organic sulfonic acid chlorides, e. g., methane sulfonyl chloride and benzene sulfonyl chloride react with olefinic compounds, e. g., ethylene, in the presence of a source of free radicals to yield chloroalkyl sulfones—trichloromethane sulfonyl chloride reacts with functionally aliphatic olefinic compounds in the presence or absence of an added source of free radicals to eliminate sulfur dioxide and add the fragments $Cl_3C-$ and $-Cl$ to the ethylenic linkage as illustrated below for the reaction with ethylene.

(1)    $Cl_3C-SO_2-Cl+CH_2=CH_2 \rightarrow$
$$Cl_3C-CH_2-CH_2-Cl+SO_2$$

In the reaction of our invention, minor amounts of higher molecular weight products are sometimes encountered. The formation of some of these may be attributed to one or more of the following reactions:

(2)    $Cl_3C-SO_2-Cl+nCH_2=CH_2 \rightarrow$
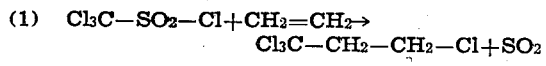
$n=2-5$ (3)    $Cl_3C-CH_2-CH_2-Cl+CH_2=CH_2 \rightarrow$
$$Cl-CH_2-CH_2-CCl_2-CH_2-CH_2-Cl$$

Our method provides a new and alternate route for the synthesis of the above type of reaction products heretofore obtained from the free-radical catalyzed reaction of carbon tetrachloride with olefinic compounds:

(4)    $CCl_4 + zCH_2=CH_2 \xrightarrow{\text{Free radicals}}$
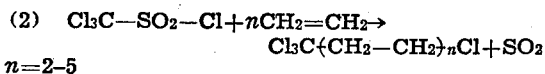
$z=1-5$ Moreover our method enjoys certain advantages over the process of the type of reaction (4) above. For example, although a source of free radicals such as ultraviolet light, or 0.1–15% by weight of a peroxygen compound, e. g., organic peroxides, including diacetyl peroxide, dibenzoyl peroxide and ter-butyl hydroperoxide may be employed to promote our reaction, in contrast to the method of Equation 4, the use of such promoters is actually unnecessary in our method to secure commercially feasible yields of the reaction products. In addition, our method employing trichloromethane sulfonyl chloride has proven effective in many cases where the method involving the use of carbon tetrachloride itself is inefficient with respect to reaction time or yield of the desired product.

We have found that trichloromethane sulfonyl chloride will react with any functionally aliphatic olefinic compound in the manner indicated above. Suitable olefinic compounds of this type include the olefinic hydrocarbons, e. g., ethylene, propylene, butene-1, butene-2, isobutylene, pentene-1, hexene-1, cyclohexene, heptene-1, octene-1, octene-2, nonene, decene, undecene, dodecene, 3-butadiene, 2-methyl-1,3-butadiene, 2,3-dimethyl-1,3-butadiene, piperylene, allyl benzene, diallyl benzene, 4-vinylcyclohexene, 1,5-hexadiene and 2,5-dimethyl-1,5-hexadiene; halogenated olefinic hydrocarbons, e. g., vinyl fluoride, vinyl chloride, vinylidene fluoride, vinylidene chloride, trifluoroethylene, trichloroethylene, tetrafluoroethylene, allyl chloride, methallyl chloride, crotyl chloride, 2,3-dichloropropene, 2-chloromethylallyl chloride, 3,3,3-trichloropropene, 1,1,3-trichloropropene, 4,4,4-trichloro-2-methylbutene-1 and 2-chloro-1,3-butadiene; olefinic alcohols, e. g., allyl alcohol, methallyl alcohol, 2-chlorallyl alcohol, 2-hydroxymethylallyl alcohols, ethallyl alcohol, crotyl alcohol, 3-butenol, 4-pentenol, and 10-undecylenyl alcohol, geraniol; ethers of the olefinic alcohols, e. g., vinyl methyl ether, vinyl ethyl ether, divinyl ether, methyl isopropenyl ether, vinyl n-butyl ether, vinyl phenyl ether, allyl ethyl ether, allyl octyl ether, allyl p-chlorophenyl ether, allyl p-methoxyphenyl ether, methallyl phenyl ether, 2-chlorallyl ethyl ether, diallyl ether, dimethallyl ether, 2-allyloxyethanol, methyl undecylenyl ether, methyl geranyl ether, including the analogous thioethers; esters of the olefinic alcohols and mono- and poly-basic, saturated and ethylenically unsaturated acids, in which the unsaturation is preferably separated from the ester group by at least one methylene group, e. g., vinyl acetate, vinyl n-butyrate, vinyl benzoate, isopropenyl acetate, allyl acetate, allyl propionate, triallyl borate, triallyl phosphate, allyl diethyl phosphate, diallyl oxalate, diallyl phthalate, allyl undecylenate, allyl ethyl sulfate, allyl dodecyl sulfite, and methallyl acetate; olefinic acids and hydrolyzable derivatives thereof including nitriles, esters, chlorides, anhydrides and amides, such as methyl acrylate, acrylic nitrile, methacrylic acid, acryly chloride, methacrylamide, dietheyl fumarate, maleic anhydride, diethyl allyl sulfonate, and diethyl 2-isobutenylphosphonate, but preferably those olefinic acids and their hydrolyzable derivatives which are devoid of alpha-ethylenic linkages, e. g., 3-butenonitrile, 4-pentenoic acid, linoleic acid, methyl undecylenate and beta-hydromuconic acid; olefinic amines, preferably the allyl-type amines, including allyl amine, diallyl amine, allyl ethyl amine, N-allyl aniline, methallyl amine and methallyl diethyl amine, as well as the corresponding amides such as N-allyl acetamide, and imides, e. g., N-allyl succinimide, N-allyl phthalimide and N-vinyl phthalimide; olefinic aldehydes, e. g., acrolein, methacrolein, and crotonaldehyde, and olefinic ketones, e. g., vinyl methyl ketone, methyl isopropenyl ketone, butyl vinyl ketone, phenyl vinyl ketone and allyl methyl ketone, trimethyl allyl silane and methyl allyl sulfone.

A preferred class of the above olefinic compounds are those having a terminal methylene group and the type formula $CH_2=CRR'$ where R and R' may be hydrogen or methyl, and R' may additionally be alkyl, e. g., ethyl, propyl, butyl, amyl and hexyl, acyl, e. g., acetyl and benzoyl, acyloxy, e. g., acetoxy, butyroxy, benzoyloxy, alkoxy, e. g., methoxy, ethoxy, aryloxy, e. g., phenoxy, p-chloro-phenoxy, tolyloxy, methylol, acylmethyl, acyloxymethyl, alkoxymethyl, and aryloxymethyl.

In Table I below, the reaction products of a number of the abovementioned olefinic compounds with trichloromethane sulfonl chloride are given in further illustration of the method of our invention.

Example 1

A mixture of 58.3 parts of trichloromethane sulfonyl chloride and 20 parts of octene-1 is dissolved in 23 parts of benzene and heated at 80° C. for 48 hours, during which time sulfur dioxide is evolved. The reaction mixture is then fractionally distilled to yield 22.3 parts of 1,1,1,3-tetrachlorononane, B. 75–7° C./0.3 mm., $n_D^{20}$ 1.4771;

Analysis: Found: 53.3% Cl; Theory, 53.3%.

Example 2

A mixture of 136 parts of trichloromethane sulfonyl chloride, 35 parts of octene-1 and 9 parts of dibenzoyl peroxide is dissolved in 87.9 parts of benzene and heated at approximately 79° C. for 48 hours, the peroxide being added in two equal portions at 0 and 24 hours of reaction time.

The reaction mixture is then washed with dilute aqueous sodium bicarbonate solution and dried after which it is fractionally distilled to yield 53.5 parts of 1,1,1,3-tetrachlorononane.

Example 3

Similarly from a mixture of 88 parts of trichloromethane sulfonyl chloride and 30 parts of octene-1 dissolved in 110 parts of absolute ethanol and heated at 78–80° C. for 48 hours is obtained 65.2 parts of the 1,1,1,3-tetrachlorononane.

TABLE I

| Olefinic Compound | Product |
|---|---|
| $CH_3-CH=CH_2$ | $CH_3-CHCl-CH_2-CCl_3$ |
| $CH_3-CH_2-CH=CH_2$ | $CH_3-CH_2-CHCl-CH_2-CCl_3$ |
| $CH_3-CH=CH-CH_3$ | $CH_3-CHCl-CH(CH_3)-CCl_3$ |
| $(CH_3)_2C=CH_2$ | $(CH_3)_2CCl-CH_2-CCl_3$ |
| $CH_3-(CH_2)_5-CH=CH_2$ | $CH_3-(CH_2)_5-CHCl-CH_2-CCl_3$ |
| $CH_2=CH-CH=CH_2$ | $Cl-CH_2-CH=CH-CH_2-CCl_3$ |
| $(CH_2=CH-CH_2)_2$ | $Cl_3C-CH_2-CHCl-(CH_2)_2-CH=CH_2$ + $(Cl_3C-CH_2-CHCl-CH_2)_2$ |
| $CH_2=CH-CH_2Cl$ | $Cl_3C-CH_2-CHCl-CH_2Cl$ |
| $CH_2=CH-CCl_3$ | $Cl_3C-CH_2-CHCl-CCl_3$ |
| $CH_2=CH-CH_2OH$ | $Cl_3C-CH_2-CHCl-CH_2OH$ |
| $CH_2=CH-O-CO-CH_3$ | $Cl_3C-CH_2-CHCl-O-CO-CH_3$ |
| $CH_2=C(CH_3)-CH_2-OCO-CH_3$ | $Cl_3C-CH_2-CCl(CH_3)-CH_2-OCO-CH_3$ |
| $CH_2=C(CH_3)-O-CH_3$ | $Cl_3C-CH_2-CCl(CH_3)-O-CH_3$ |
| $CH_2=CH-(CH_2)_8-COOH$ | $Cl_3C-CH_2-CHCl-(CH_2)_8-COOH$ |
| $CH_2=CH-CO-CH_3$ | $Cl_3C-CH_2-CHCl-CO-CH_3$ |

The reaction of our invention is carried out by heating each molar equivalent of the functionally aliphatic olefinic compound with from 0.5 to 20 molar equivalents of trichloromethane sulfonyl chloride at 25–125° C. and preferably from 50 to 100° C. for a time sufficient to effect reaction, such reaction times being ordinarily in the range of from 5 to 80 hours. The reaction can be carried out in the presence or absence of a source of free radicals as previously defined, and in the presence or absence of a solvent or diluent such as a liquid hydrocarbon, e. g., benzene, n-hexane, an alcohol, e. g., ethanol, an ether, e. g., diethyl ether, dibutyl ether, and/or an ester, e. g., ethyl acetate.

Where gaseous olefinic reactants, e. g., ethylene, are employed, the reaction is carried out under sufficient pressure to constrain the olefinic compound in the reaction mixture at the reaction temperatures mentioned above. Such pressures are usually in the range of from 100 to 500 p. s. i.

The reaction products are isolated and purified by the conventional techniques of organic chemistry, including extraction, fractional distillation and crystallization.

The following examples disclose our invention in more detail. All parts are by weight.

Example 4

A mixture of 121.5 parts of trichloromethane sulfonyl chloride, 42.0 parts of octene-1 and 10.8 parts of dibenzoyl peroxide is dissolved in 157 parts of absolute ethanol and heated for 48 hours at 78–80° C., the peroxide being added in two equal portions at 0 and 24 hours of reaction time.

From the reaction mixture, 83.8 parts of the 1,1,1,3-tetrachlorononane are obtained by distillation. $d^{20}/4$ 1.1863.

Analysis:

| | Per Cent C | Per Cent H | Per Cent Cl |
|---|---|---|---|
| Found | 40.8 | 6.4 | 53.1 |
| Theory | 40.6 | 6.1 | 53.3 |

Example 5

In the manner of preceding examples, a mixture of 23.3 parts of trichloromethane sulfonyl chloride and 35 parts of octene-1, in the absence of diluent and catalyst, yields 17.9 parts of the 1,1,1,3-tetrachlorononane.

Example 6

A solution of 55 parts of trichloromethane sulfonyl chloride and 5.5 parts of dibenzoyl peroxide in 133 parts of benzene is inclosed in a glass-lined pressure vessel. The latter is exhausted and ethylene is admitted until a pressure of 250 p. s. i. is attained. The reaction vessel is then heated at 70° C. with agitation for 18 hours during which time the pressure is maintained at about 400 p. s. i. by addition of ethylene.

At the end of the reaction, the vessel is cooled and opened. The contents are filtered to remove approximately 11.8 parts of polymeric solid which is present, the filtrate is diluted with 890 parts of benzene, washed with dilute aqueous sodium bicarbonate and dried. The benzene is then removed by evaporation and the residue is fractionally distilled to yield 9.7 parts of 1,1,1,3-tetrachloropropane, B. 40° C./10 mm; $n_D^{20}$ 1.4825 together with some higher-boiling chlorine-containing materials.

Example 7

A mixture of 63.0 parts of trichloromethane sulfonyl chloride, 14.3 parts of isoprene and 4.0 parts of dibenzoyl peroxide is dissolved in 96.7 parts of benzene and heated for 22.5 hours at 80–5° C. Thirty-nine and four-tenths parts of absolute ethanol are then added and the mixture is heated at reflux for an additional 24 hours.

Fractional distillation of the reaction mixture yields a tetrachlorohexene which appears to be 1,1,1,5-tetrachloro-3-methylpentene-2, or an isomer thereof, B. 96–8° C./6 mm; $n_D^{20}$ 1.5129;

Analysis: Found, 63.8% Cl. Theory, 63.8%.

Example 8

A mixture of 23.3 parts of trichloromethane sulfonyl chloride and 31.0 parts of allyl acetate is heated at approximately 79° C. for 48 hours during which time the evolution of sulfur dioxide is evident.

Fractional distillation of the reaction mixture yields 2,4,4,4-tetrachlorobutyl acetate, B. 66° C./0.3 mm.

Analysis: Found, 55.0% Cl; Theory, 55.8%.

Example 9

A mixture of 23.3 parts of trichloromethane sulfonyl chloride and 54 parts of allyl alcohol is heated for 48 hours at approximately 79° C. Fractional distillation of the reaction mixture yields 2,4,4,4-tetrachlorobutanol, B. 60–2° C./0.5 mm; $n_D^{20}$ 1.5065.

Analysis: Found, 66.9% Cl; Theory, 66.9%.

While we have shown and described various embodiments of the invention, it is to be understood that the invention is susceptible to other modifications which appear within the spirit of the invention and the scope of the appended claims.

Having thus described our invention, what we claim and desire to protect by Letters Patent is:

1. A method of producing trichloromethyl compounds which comprises heating at a temperature in the range from about 50 to 125° C. for from about 5 to about 80 hours, 0.5 to 20 molar equivalents of trichloromethane sulfonyl chloride with one mole equivalent of a solely aliphatic monomeric olefinic compound having only from one to two ethylenic bonds per molecule, and causing the elimination of sulfur dioxide from the trichloromethane sulfonyl chloride, and adding of the fragments $Cl_3C-$ and $-Cl$ to the olefinic compound.

2. A method which comprises heating at a temperature in the range from about 50 to 125° C. for from about 5 to about 80 hours, 0.5 to 20 molar equivalents of trichloromethane sulfonyl chloride with one mole equivalent of a solely aliphatic monomeric hydrocarbon compound having only from one to two ethylenic bonds per molecule.

3. A method which comprises heating at a temperature in the range from about 50 to 125° C. for from about 5 to about 80 hours, 0.5 to 20 molar equivalents of trichloromethane sulfonyl chloride with one mole equivalent of a solely aliphatic monomeric ester of an olefinic alcohol having only from one to two ethylenic bonds per molecule.

4. A method which comprises heating at a temperature in the range from about 50 to 125° C. for from about 5 to about 80 hours, 0.5 to 20 molar equivalents of trichloromethane sulfonyl chloride with one mole equivalent of a solely aliphatic monomeric ether of an olefinic alcohol having only from one to two ethylenic bonds per molecule.

ELBERT C. LADD.
LEWIS Y. KILEY.

REFERENCES CITED

The following references are of record in the file of this patent:

UNITED STATES PATENTS

| Number | Name | Date |
|---|---|---|
| 2,355,261 | Seger | Aug. 8, 1944 |
| 2,440,800 | Hanford et al. | May 4, 1948 |

FOREIGN PATENTS

| Number | Country | Date |
|---|---|---|
| 880,403 | France | Mar. 25, 1943 |

OTHER REFERENCES

Sturgis, Ind. Eng. Chem., vol. 39, pages 64–68 (1947).

Kharasch et al., "Science," vol. 102, page 128 (1945).